(12) United States Patent
Lym et al.

(10) Patent No.: US 6,516,361 B2
(45) Date of Patent: *Feb. 4, 2003

(54) METHOD OF AND APPARATUS FOR CAPTURING AND PROCESSING CONTINUOUS MEDIA-BASED DATA STREAMS TRANSMITTED OVER AN IEEE 1394 SERIAL BUS

(75) Inventors: Kevin K. Lym, Alameda; Hisato Shima, Saratoga; Larry White, San Jose; Quan Vu, Milpitas, all of CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,533

(22) Filed: Sep. 17, 1998

(65) Prior Publication Data

US 2001/0011310 A1 Aug. 2, 2001

(51) Int. Cl.7 ................................................ G06F 12/00
(52) U.S. Cl. .................... 710/56; 709/104; 711/133; 711/173
(58) Field of Search .............................. 710/52, 53, 56, 710/57, 310; 711/133, 153, 173, 147, 148, 154, 156, 159; 709/104, 105

(56) References Cited

U.S. PATENT DOCUMENTS

| 4,998,245 A | 3/1991 | Tanaka et al. .............. 370/85.1 |
| 5,161,215 A | 11/1992 | Kouda et al. ................ 395/250 |
| 5,426,639 A | 6/1995 | Follett et al. ............... 370/94.1 |
| 5,444,709 A | 8/1995 | Riddle ........................ 370/94.1 |
| 5,471,450 A | 11/1995 | Yonemitsu et al. ........... 369/60 |

(List continued on next page.)

OTHER PUBLICATIONS

"P1394 Standard For A High Performance Serial Bus," P1394 Draft 8.0v2, Jul. 7, 1995, IEEE, New York, New York.

(List continued on next page.)

*Primary Examiner*—Matthew Kim
*Assistant Examiner*—C. P. Chace
(74) *Attorney, Agent, or Firm*—Haverstock & Owens LLP

(57) ABSTRACT

A method of and apparatus for capturing and processing Continuous media-based data streams transmitted over an IEEE 1394 serial bus manages the use of both receive buffers and process buffers in order to minimize the amount of captured data that is discarded due to unavailable process buffers. When receiving a stream of continuous data. the data is captured and stored within a current receive buffer. When the current receive buffer is full. the captured data within the receive buffer is then read out, processed and stored within a process buffer, if a process buffer is available on a cached list of process buffers. When Full of processed data, the process buffer is then transferred to an application for utilization or further processing of the processed data. If the process buffer is not completely filled, then the process buffer is added back to the cached list of process buffers. If a receive buffer is tilled and no process buffer is available or if there are already filled receive buffers on a cached list of receive buffers, the filled receive buffer is then added to the cached list of receive buffers. When a process buffer is then available, the data within the earliest filled receive buffer on the cached list of receive buffers is processed and transferred to the available process buffer. If the receive buffer is not emptied, the receive buffer is then put back on the cached list of receive buffers. When the cached list of receive buffers includes a predetermined number of buffers. the data within the earliest filled receive buffer on the cached list of receive buffers is discarded. thereby emptying the receive buffer. The emptied receive buffer is then added to the series of available receive buffers to receive the current captured data.

52 Claims, 6 Drawing Sheets

U.S. PATENT DOCUMENTS

| | | | |
|---|---|---|---|
| 5,481,543 A | 1/1996 | Veltman | 370/94.1 |
| 5,508,940 A | 4/1996 | Rossmere et al. | 364/514 A |
| 5,509,126 A | 4/1996 | Oprescu et al. | 395/307 |
| 5,519,701 A | 5/1996 | Colmant et al. | 370/60.1 |
| 5,535,137 A | 7/1996 | Rossemere et al. | 364/514 A |
| 5,546,389 A | 8/1996 | Wippenbeck et al. | 370/60 |
| 5,629,936 A | 5/1997 | Lee et al. | 370/230 |
| 5,661,848 A | 8/1997 | Bonke et al. | 395/439 |
| 5,682,553 A | 10/1997 | Osborne | 395/876 |
| 5,710,773 A | 1/1998 | Shiga | 370/512 |
| 5,758,075 A | 5/1998 | Graziano et al. | 395/200.8 |
| 5,781,599 A | 7/1998 | Shiga | 375/376 |
| 5,815,678 A | 9/1998 | Hoffman et al. | 395/309 |
| 5,832,245 A | 11/1998 | Gulick | 395/309 |
| 5,859,835 A | 1/1999 | Varma et al. | 370/229 |
| 5,933,430 A | 8/1999 | Osakabe et al. | 370/395 |
| 5,991,307 A | 11/1999 | Komuro et al. | 370/473 |

OTHER PUBLICATIONS

Michael Teener et al., "A Bus on a Diet—The Serial Bus Alternative. An Introduction to the P1394 High Performance Serial Bus." p.316–321, Jan. 24, 1992, XP 000340753, IEEE.

R.H.J. Bloks, "The IEEE–1394 High Speed Serial Bus," pp. 209–216, Doc. No. XP 000627671, Philips Journal of Research, vol. 50, No. 1/2, 1996.

METHOD OF AND APPARATUS FOR CAPTURING AND PROCESSING CONTINUOUS MEDIA-BASED DATA STREAMS TRANSMITTED OVER AN IEEE 1394 SERIAL BUS

FIELD OF THE INVENTION

The present invention relates to the field of transmitting information between devices. More particularly, the present invention relates to the field of capturing and processing data received by a device.

BACKGROUND OF THE INVENTION

The IEEE 1394-1995 standard, "1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochrolnously is transferred in its own time period. An example of an ideal application for the transfer of data isochroniously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple channels for isochronous data transfer between applications. A six bit channel number is broadcast with the data to ensure reception by the appropriate application. This allows multiple applications to concurrently transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394-1995 cable environment is a network of nodes connected by point-to-point links, including a port on each node's physical connection and the cable between them. The physical topology for the cable environment of an IEEE 1394-1995 serial bus is a non-cyclic network of multiple ports, with finite branches. The primary restriction on the cable environment is that nodes must be connected together without forming any closed loops.

The IEEE 1394-1995 cables connect ports together on different nodes. Each port includes terminators, transceivers and simple logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-1995 serial bus. Using these components. the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

When a stream of continuous data. such as a digital video stream from a video camera. is received by a device over the IEEE 1394-1995 serial bus, the data is typically captured by the device and stored within a series of receive buffers. As each receive buffer is filled. the data within the receive buffer is then processed and transferred to a process data buffer within a supply of process buffers. The emptied receive buffer is then added back into the series of receive buffers to be used to receive more data within the stream of continuous data. After being filled with processed data, the process data buffer is provided to an application, such as a video renderer or a digital video CODEC, to be utilized or further processed by the application. Once utilized or processed by the application, the processed data buffer is added back into the supply of process buffers in order to receive additional processed data within the stream of continuous data.

The process buffers are provided by the application in a non-continuous fashion and from a limited supply. Typically, at some point during the reception of a continuous stream of data, the supply of process buffers will not keep up with the number of receive buffers being filled with captured data. When a receive buffer is filled and no process buffer is available, the captured data within the receive buffer cannot be processed and transferred to a process buffer. The stream of continuous data must still be captured and stored within the receive buffers. Accordingly, when no process buffer is available to receive captured and processed data, the data within the filled receive buffer is typically discarded and the receive buffer is added back into the series of receive buffers in order to store currently captured data within the incoming stream of continuous data. This discarded data is then lost and cannot be retrieved, utilized or processed by the receiving application. In some applications this loss of data will cause discontinuity in the use and display of the processed data.

SUMMARY OF THE INVENTION

A method of and apparatus for capturing and processing continuous media-based data streams transmitted over an IEEE 1394 serial bus manages the use of both receive buffers and process buffers in order to minimize the amount of captured data that is discarded due to unavailable process buffers. When receiving a stream of continuous data, the data is captured and stored within a current receive buffer. When the current receive buffer is full, the captured data within the receive buffer is then read out, processed and stored within a process buffer, if a process buffer is available on a cached list of process buffers. When full of processed data, the process buffer is then transferred to an application for utilization or further processing of the processed data. If the process buffer is not completely Filled, then the process buffer is added back to the cached list of process buffers. If a receive buffer is filled and no process buffer is available or if there are already filled receive buffers on a cached list of receive buffers, the filled receive buffer is then added to the cached list of receive buffers. When a process buffer is then available, the data within the earliest filled receive buffer on the cached list of receive buffers is processed and transferred to the available process buffer. If the receive buffer is not emptied, the receive buffer is then put back on the cached list of receive buffers. When the cached list of receive buffers includes a predetermined number of buffers, the data within the earliest filled receive buffer on the cached list of receive buffers is discarded, thereby emptying the receive buffer. The emptied receive buffer is then added to the series of available receive buffers to receive the current captured data.

In one aspect of the present invention, a method of processing captured data includes the steps of receiving a receive buffer filled with captured data. adding the receive buffer to a cached list of receive buffers if there are previously filled buffers on the cached list of receive buffers, adding the receive buffer to the cached list of receive buffers if no process buffer is available and processing the captured data within the receive buffer if the process buffer is available and there are no previously filled buffers on the cached list of receive buffers. The method further includes the step of processing data within an earliest filled receive buffer on the cached list of receive buffers if the process buffer is available and there are previously filled buffers on the cached list of receive buffers. The method further includes the step of storing processed data within the process buffer. The method further includes the step of providing a filled process buffer to an application. The method further includes the step of emptying the earliest filled receive buffer on the cached list of receive buffers if the cached list of receive buffers includes a predetermined number of buffers. Preferably, the predetermined number of buffers is equal to one half a number of available receive buffers. The captured data is preferably captured from an IEEE 1394-1995 serial bus. The method further includes the step of adding an available process buffer to a cached list of process buffers if no receive buffers are filled when the available process buffer becomes available.

In another aspect of the present invention, a method of receiving and processing captured data includes the steps of storing captured data within a receive buffer. thereby forming a filled receive buffer, adding the filled receive buffer to a cached list of receive buffers if there are previously filled buffers on the cached list of receive buffers, adding the filled receive buffer to the cached list of receive buffers if no process buffer is available and processing the captured data within the filled receive buffer if the process buffer is available and there are no previously filled buffers on the cached list of receive buffers. The method further includes the step of processing data within an earliest filled receive buffer on the cached list of receive buffers if the process buffer is available and there are previously filled buffers on the cached list of receive buffers. The method further includes the step of storing processed data within the process buffer. The method further includes the step of providing a filled process buffer to an application. The method further includes the step of emptying the earliest filled receive buffer on the cached list of receive buffers if the cached list of receive buffers includes a predetermined number of buffers. Preferably. the captured data is captured from an IEEE 1394 serial bus. The predetermined number of buffers is preferably equal to one half a number of available receive buffers. The method further includes the step to adding an available process buffer to a cached list of process buffers if no receive buffers are filled when the available process buffer becomes available.

In still another aspect of the present invention, an apparatus for receiving, and processing captured data includes a receiving circuit for receiving captured data, a plurality of receive buffers for storing captured data, a plurality of process buffers for storing processed data and providing the processed data to an application, a processing apparatus for processing captured data thereby forming the processed data and storing the processed data within the process buffers and a cached list of receive buffers, wherein a filled receive buffer is added to the cached list of receive buffers if no process buffers are available when the filled receive buffer is filled and further wherein a filled received buffer is added to the cached list of receive buffers if there are previously filled receive buffers on the cached list of receive buffers when the filled receive buffer is filled. Within the apparatus, data within an earliest filled receive buffer on the cached list of receive buffers is processed first and stored within an available process buffer, if there are previously filled buffers on the cached list of receive buffers. An earliest filled receive buffer on the cached list of receive buffers is emptied, if the cached list of receive buffers includes a predetermined number of buffers. The receiving circuit includes an interface circuit configured for coupling to an IEEE 1994 serial bus structure to receive the captured data. The apparatus further includes a cached list of process buffers, wherein an available process buffer is added to the cached list of process buffers if no receive buffers are filled when the available process buffer becomes available.

In another aspect of the present invention, a method of transmitting a continuous stream of data, including a plurality of packets of data, from a transmitting node to a receiving node over an IEEE 1394 serial bus structure, includes the steps oft receiving the packets of data at the receiving node, thereby forming captured data, storing tile captured data within a receive buffer, thereby forming a filled receive buffer, adding the filled receive buffer to a cached list of receive buffers if there are previously filled buffers on the cached list of receive buffers, adding the filled receive buffer to the cached list of receive buffers if no process buffer is available, processing the captured data within the filled receive buffer if the process buffer is available and there are no previously filled buffers on the cached list of receive buffers and emptying an earliest filled buffer on the cached list of receive buffers if the cached list of receive buffers includes a predetermined number to buffers. The method further includes the step of processing data within the earliest filled receive buffer on the cached list of receive buffers if the process buffer is available and there are previously filled buffers on the cached list of receive buffers. The method further includes the step of storing processed data within the process buffer. The method further includes the step of providing a filled process buffer to an application. Preferably, the predetermined number of buffers is equal to one half a number of available receive buffers. The captured data is preferably captured from an IEEE 1394 serial bus. The method further includes the step of adding an available process buffer to a cached list of process buffers if no receive buffers are filled when the available process buffer becomes available.

In another aspect of the present invention, a network of devices includes a transmitting device for transmitting packets of data, a bus structure coupled to the transmitting device. wherein the packets of data are transmitted over the bus structure and a receiving device coupled to the bus structure to receive the packets of data, the receiving device including a receiving circuit for receiving the packets of data, a plurality of receive buffers for storing captured data, a plurality of process buffers for storing processed data and providing the processed data to an application, a processing apparatus for processing captured data thereby forming the processed data and storing the processed data within the processed buffers and a cached list of receive buffers, wherein a filled receive buffer is added to the cached list of receive buffers if no process buffers are available when the filled receive buffer is filled and further wherein a filled receive buffer is added to the cached list of receive buffers if there are previously filled receive buffers on the cached list of receive buffers when the filled receive buffer is filled. Within the network of devices data within an earliest filled receive buffer on the cached list of receive buffers is processed first and stored within an available process buffer, if there are previously filled buffers on the cached list of receive buffers. An earliest filled receive buffer on the cached list of receive buffers is emptied, if the cached list of receive buffers includes a predetermined number of buffers. Preferably, the bus structure is an IEEE 1394 serial bus structure. The network of devices further includes a cached list of process buffers, wherein an available process buffer is added to the cached list of process buffers if no receive buffers are filled when the available process buffer becomes available.

DETAILED DESCRIPTION OF THE PREFERRED EMBODIMENT

Figure 1:
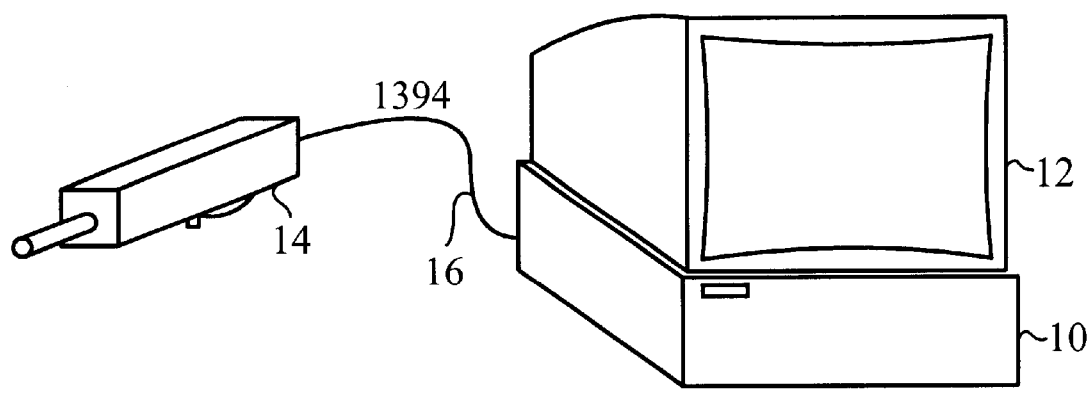
FIG. 1 illustrates a block diagram of an IEEE 1394-1995 serial bus network including a computer system and a video camera.

A block diagram of an exemplary IEEE 1394-1995 serial bus network including a computer system and a video camera is illustrated in FIG. 1. The computer system 10 includes an associated display 12 and is coupled to the video camera 14 by the IEEE 1394-1995 serial bus cable 16. Video data and associated data are sent between the video camera 14 and the computer 10 over the IEEE 1394-1995 serial bus cable 16.

Figure 2:
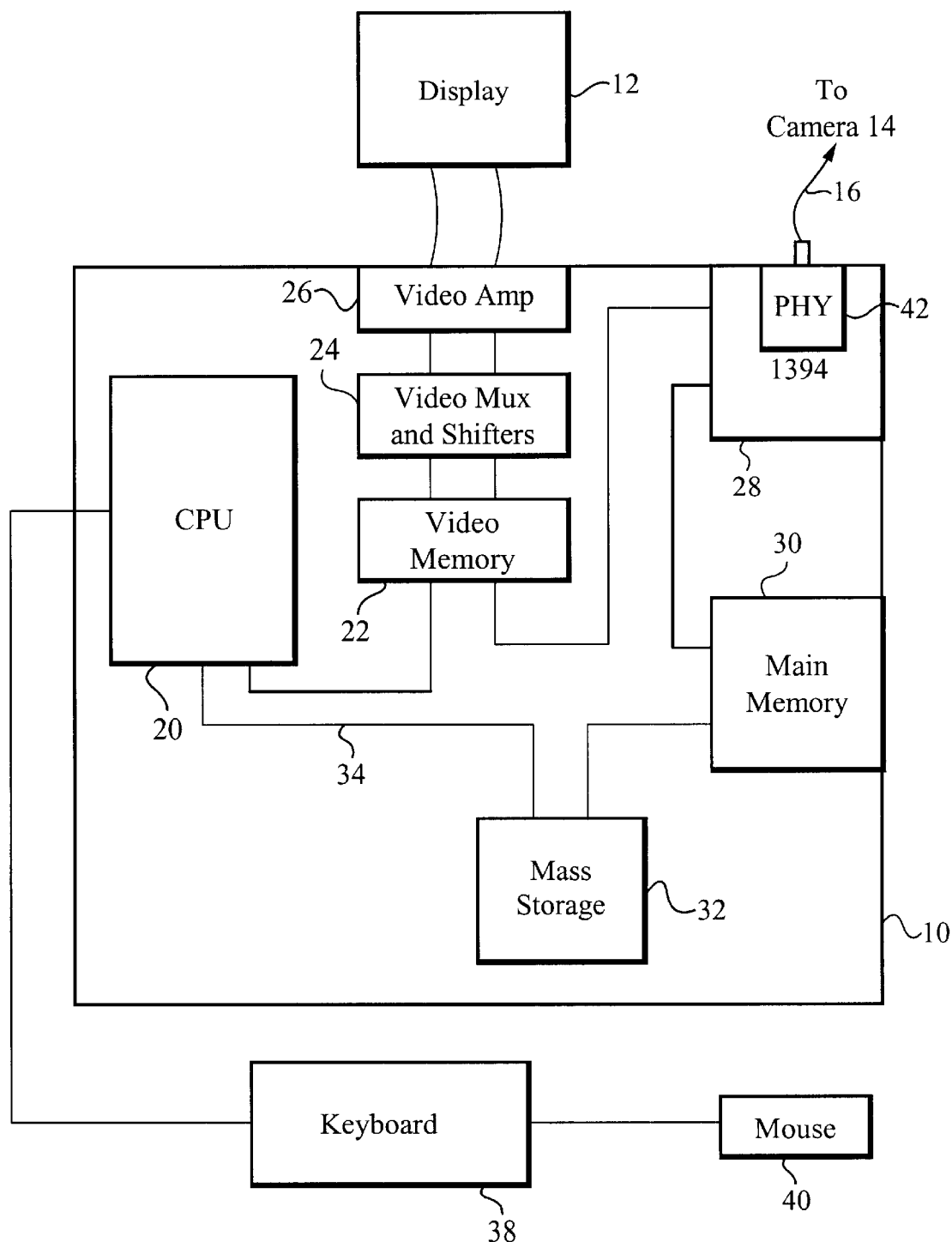
FIG. 2 illustrates a block diagram of the internal components of the computer system 10.

A block diagram of the internal components of the computer system 10 is illustrated in FIG. 2. The computer system 10 includes a central processor unit (CPU) 20, a main memory 30, a video memory 22, a mass storage device 32 and an IEEE 1394-1995 interface circuit 28, all coupled together by a conventional bidirectional system bus 34. The interface circuit 28 includes the physical interface circuit 42 for sending and receiving communications on the IEEE 1394-1995 serial bus. The physical interface circuit 42 is coupled to the camera 14 over the IEEE 1394-1995 serial bus cable 16. In the preferred embodiment of the present invention, the interface circuit 28 is implemented on an IEEE 1394-1995 interface card within the computer system 10. However, it should be apparent to those skilled in the art that the interface circuit 28 can be implemented within the computer system 10 in any other appropriate manner, including building the interface circuit onto the motherboard itself. The mass storage device 32 may include both fixed and removable media using any one or more of magnetic, optical or magneto-optical storage technology or any other available mass storage technology. The system bus 34 contains an address bus for addressing any portion of the memory 22 and 30. The system bus 34 also includes a data bus for transferring data between and among the CPU 20, the main memory 30, the video memory 22. the mass storage device 32 and the interface circuit 28.

The computer system 10 is also coupled to a number of peripheral input and output devices including the keyboard 38, the mouse 40 and the associated display 12. The keyboard 38 is coupled to the CPU 20 for allowing a user to input data and control commands into the computer system 10. A conventional mouse 40 is coupled to the keyboard 38 for manipulating graphic images on the display 12 as a cursor control device.

A port of the video memory 22 is coupled to a video multiplex and shifter circuit 24, which in turn is coupled to a video amplifier 26. The video amplifier 26 drives the display 12. The video multiplex and shifter circuitry 24 and the video amplifier 26 convert pixel data stored in the video memory 22 to raster signals suitable for use by the display 12.

When receiving a stream of continuous data. an apparatus according to the present invention manages the use of both receive buffers within the series of receive buffers and process buffers within the supply of process buffers to maximize the amount of captured data that is processed and transferred to the application and minimize the amount oft captured data that is discarded due to unavailable process buffers. When receiving a stream of continuous data, the data is captured and stored within a current receive buffer. as described above. When the current receive buffer is full, the captured data within the receive buffer is then read out, processed and stored within a process buffer, if one is available on a cached list of process buffers and there are no filled receive buffers on the cached list of receive buffers. When full, the process buffer is then transferred to an application for utilization or further processing. If the process buffer is not completely filled, then the process bluffer is added back to the cached list of process buffers. If a receive buffer is tilled and there is no available process buffer to transfer the processed data to or if there are already receive buffers on the cached list of receive buffers, the filled receive buffer is then added to the cached list of receive buffers. When a process buffer is then available, the data within the earliest filled receive buffer on the cached list of receive buffers is processed and transferred to the available process buffer. If the receive buffer is not emptied, the receive buffer is then added back onto the cached list of receive buffers until the next process buffer is available. When the cached list of receive buffers includes a predetermined number of buffers, then the data within the earliest filled receive buffer on the cached list of receive buffers is discarded and the emptied receive buffer is made available to receive the current captured data. Preferably, this predetermined number of buffers is equal to one half of the number of available receive buffers within the system.

The receive and process buffers preferably are formed within a continuous memory space within the main memory 30. Alternatively, the receive and process buffers can be formed within any appropriate memory space including the mass storage device 32, the video memory 22 or a dedicated memory device.

Figure 3A:
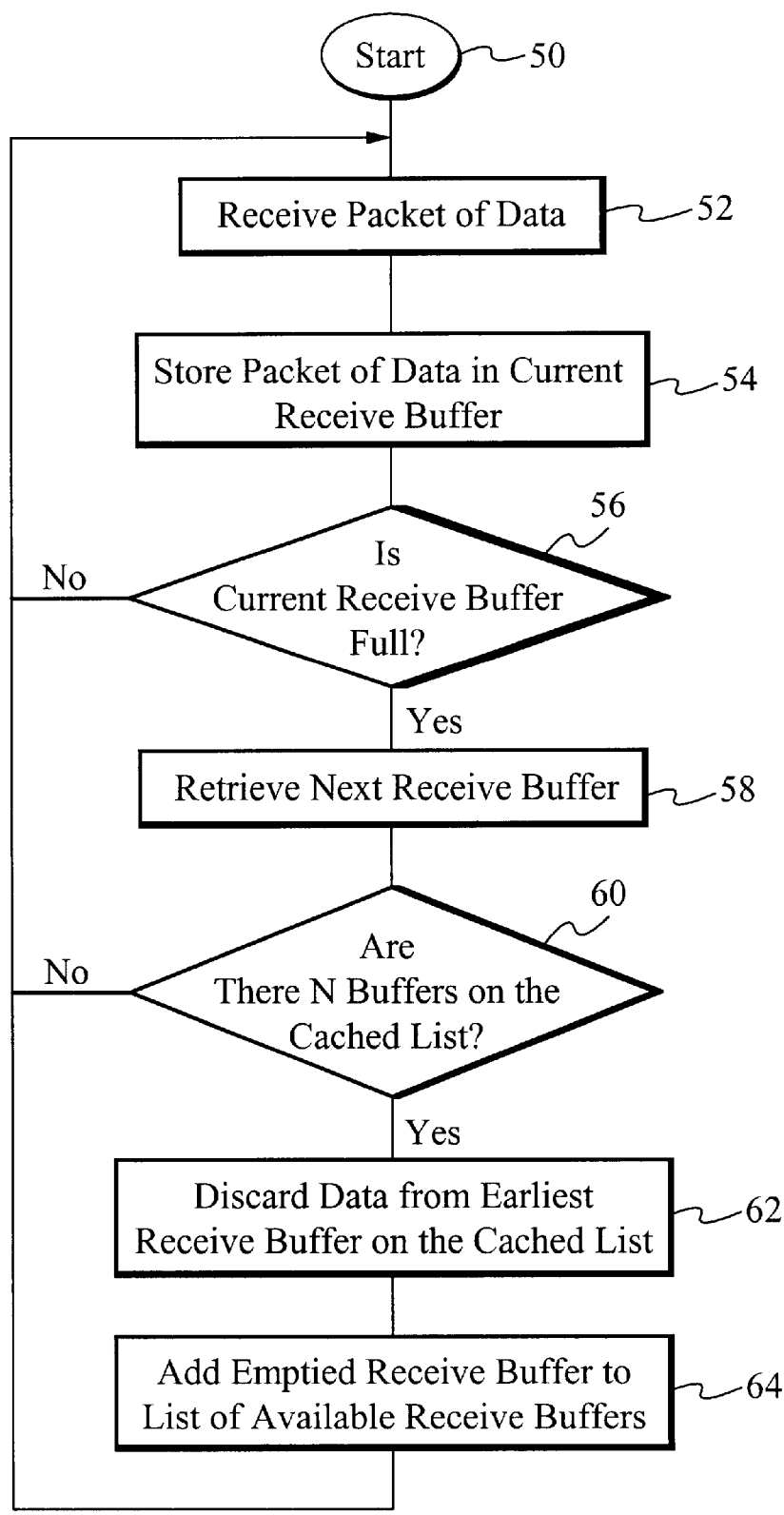
FIGS. 3A and 3B illustrate flow diagrams of the steps involved in managing the reception and processing of a continuous stream of data.
Figure 3B:
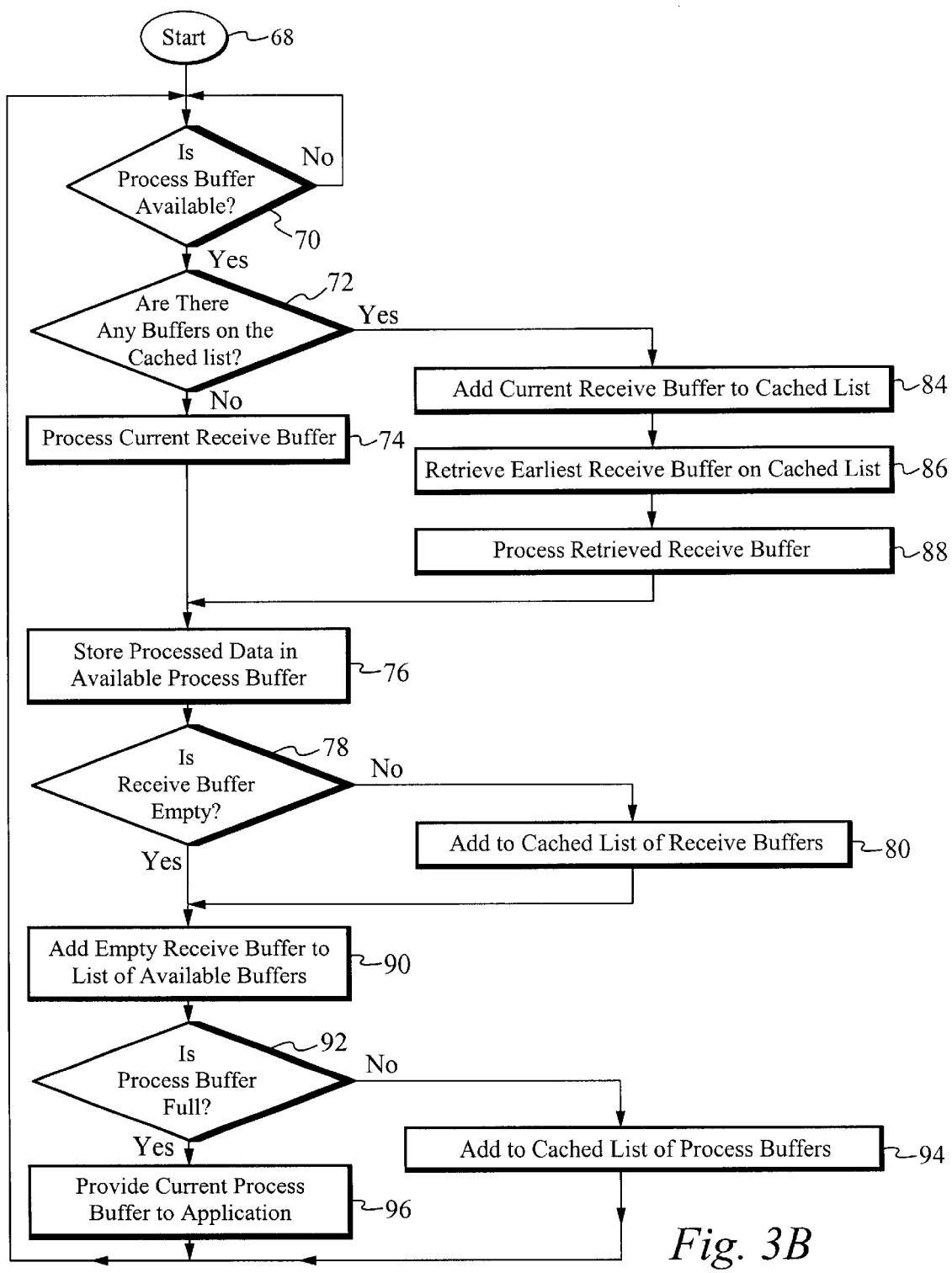

Flow diagrams of the steps involved in managing the reception and processing of a continuous stream of data are illustrated in FIGS. 3A and 3B. The flowchart of FIG. 3A is entered at the step 50 when an application within the computer 10 begins receiving a stream of continuous data from a source, such as the video camera 14 over the IEEE 1394-1995 serial bus 16. At the step 52, the computer 10 receives the current packet of data from the IEEE 1394-1995 serial bus 16. At the step 54, the computer 10 stores the current captured packet of data in the current receive buffer. At the step 56, the system determines if the current receive buffer is full. If it is determined at the step 56 that the current receive buffer is not full, then the system jumps back to the step 52 to receive the next packet of data and store that packet in the current receive buffer. When it is determined at the step 56 that the current receive buffer is full, then the next receive buffer is retrieved at the step 58. The system then determines, at the step 60, if there are a predetermined number of receive buffers on the cached list of receive buffers. Preferably, the predetermined number of receive buffers is equal to one half of the total number of available receive buffers. Alternatively. the predetermined number is equal to any appropriate number which allows the system to appropriately receive and process the incoming stream of data. If there are not a number of receive buffers on the cached list of receive buffers equal to the predetermined number, then the system jumps back to the step 52 to receive the next packet of captured data within the continuous stream of data and store it within the next receive buffer. If there are a number of receive buffers on the cached list of receive buffers equal to the predetermined number, then the captured data within the earliest receive buffer is discarded at the step 62. thereby emptying the earliest filled receive buffer on the cached list of receive buffers. The emptied receive buffer is then added to the list of available receive buffers at the step 64. The system then jumps back to the step 52 to receive the next packet of captured data within the continuous stream and store it in the next receive buffer.

The steps involved in processing the filled receive buffers are illustrated in the flowchart of FIG. 3B. The flowchart of FIG. 3B is entered at the step 68. At the step 70, it is determined if there is a process buffer available in which to store data processed from a receive buffer. When a process buffer is available, it is determined at the step 72 if there are any buffers on the cached list of receive buffers. If there are buffers on the cached list of receive buffers, then the current receive buffer is added to the bottom of the cached list at the step 84. The earliest or top receive buffer on the cached list of receive buffers is then retrieved for processing at the step 86. At the step 88, the data within the retrieved receive buffer is then processed. If it is determined at the step 72 that there are not any buffers on the cached list of receive buffers, then the data within the current receive buffer is processed at the step 74. As will be apparent to those skilled in the art, there are many well known methods of processing the captured data for the application. Preferably, during the processing steps the data from the receive buffers is processed and put into a form that is readable by the application. This processing also preferably includes stripping the headers from the data packets.

After the current receive buffer is processed at the step 74 or the retrieved receive buffer is processed at the step 88, depending on whether or not there are buffers on the cached list of receive buffers, the processed data is then stored in the available process buffer at the step 76. If the current or retrieved receive buffer has not been emptied, then the current or retrieved receive buffer is added back to the cached list of receive buffers at the step 80. Otherwise, if it is determined at the step 78 that the current or retrieved receive buffer has been emptied, then the current or retrieved receive buffer is not added to the cached list of receive buffers. The emptied receive buffer is added to the list of available receive buffers at the step 90 for storing additional captured data within the continuous stream of data. It is then determined at the step 92 if the current process buffer has been filled. If the current process buffer has not been filled, then the current process buffer is added to the cached list of process buffers at the step 94 and the system jumps back to the step 70 to continue filling the current process buffer with data from another receive buffer. Otherwise. if it is determined at the step 92 that the current process buffer has been filled then the current process buffer is provided to the application at the step 96. The computer system 10 then returns to the step 70 until another process buffer is available.

Figure 4:
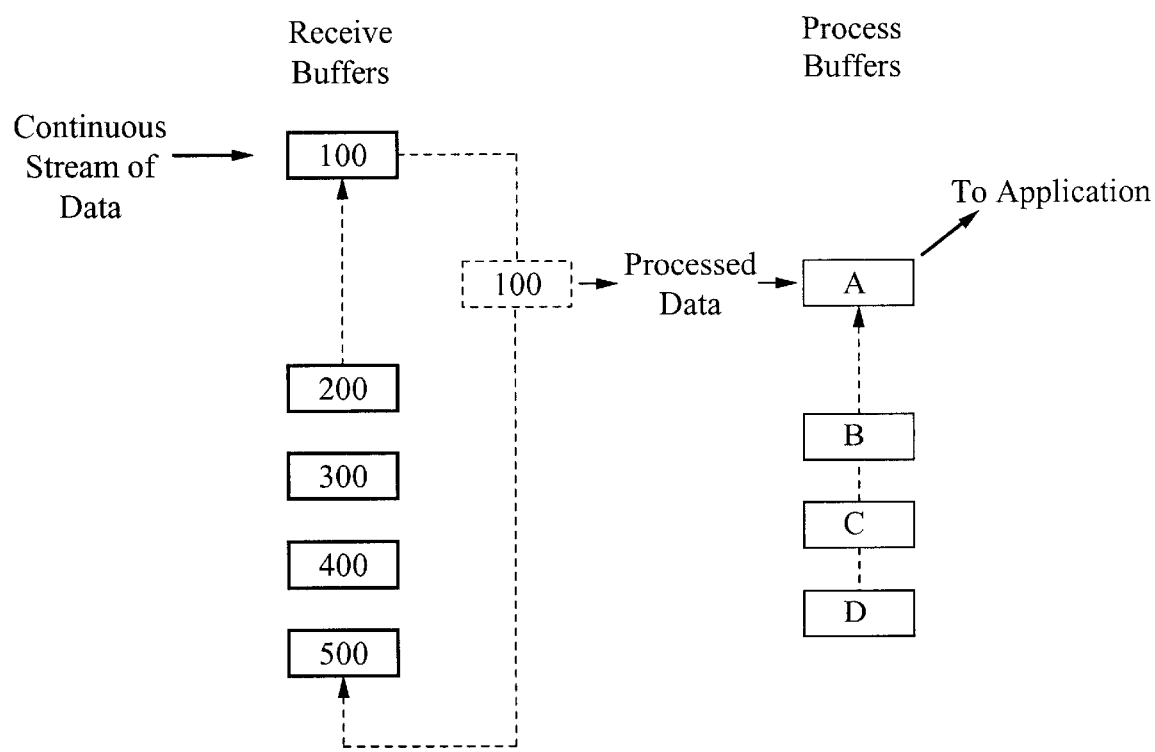
FIG. 4 illustrates an example of the capturing and processing of data within a continuous stream of data.

An example of the capturing and processing of data within a continuous stream of data is illustrated in FIG. 4. The continuous stream of data is stored within the receive buffers 100, 200, 300, 400 and 500. When a receive buffer is full, the data within the filled receive buffer is then processed and stored within an available one of the process buffers A, B, C and D. Captured packets from the continuous stream of data are stored within the current receive buffer 100 until the buffer is full. When the current receive buffer 100 is full. the captured packets from the continuous stream of data are stored within the next receive buffer 200 within the series of receive buffers. When the current receive buffer 100 is full, if a process buffer A is available and there arc no receive buffers on the cached list of receive buffers, the data within the current receive buffer 100 is processed and transferred to the process buffer A. When the data within the current receive buffer 100 has all been processed and transferred to the process buffer A, then the receive buffer 100 is added back into the series of receive buffers to receive more captured packets of data within the continuous stream of data. When the process buffer A is full, it is then transferred to the application for utilization, such as display or storage, or further processing. If available, the next process buffer B is then retrieved and processed data from filled receive buffers is transferred to the process buffer B.

Figure 5:
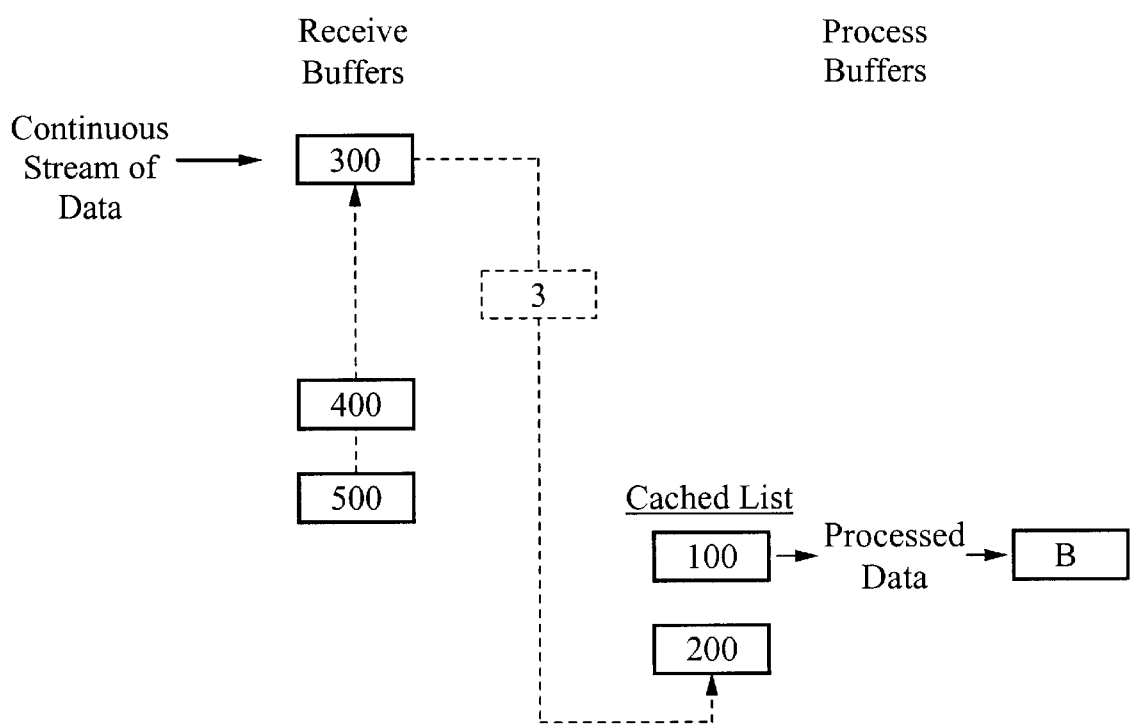
FIG. 5 illustrates an example of the capturing and processing of data using a cached list of filled receive buffers, according to the present invention.

An example of the capturing of data according to the present invention when process buffers are not available, is illustrated in FIG. 5. The continuous stream of data is stored within the receive buffers 300, 400 and 500. In this example, when the receive buffers 100 and 200 were filled there were no process buffers available. Because there were no process buffers available, the filled receive buffers 100 and 200 were added to the cached list of receive buffers. Because the receive buffers 100 and 200 are on the cached list of receive buffers, when the current receive buffer 300 is filled, it will also be added to the cached list of receive buffers. When the process buffer B is available, the data within the earliest receive buffer on the cached list of receive buffers will be processed and transferred to the process buffer B. In this example, the earliest buffer on the cached list of receive buffers is the receive buffer 100. When the data within the receive buffer 100 has all been processed and transferred to the process buffer B. then the receive buffer 100 is added back into the series of receive buffers to receive more captured packets of data within the continuous stream of data. When the process buffer B is full, it is then transferred to the application for use. When another process buffer is available, the data within the next receive buffer 200 on the cached list of receive buffers is then processed and transferred into the available process buffer. It the cached list of receive buffers includes a predetermined number of buffers. then the earliest receive buffer on the cached list of receive buffers is emptied and added back into the series of receive buffers. Preferably, the predetermined number is equal to one l halt the number of available receive buffers. As should be apparent to those skilled in the art. alternatively the earliest receive buffer on the cached list of receive buffers can be emptied and added back into the series of receive buffers when there are any appropriate number of receive buffers on the cached list of receive buffers. This number of receive buffers on the cached list of receive buffers will depend on the configuration and the number of available receive buffers within the receiving device.

The apparatus for and method of capturing and processing continuous media-based data streams transmitted over the IEEE 1394-1995 serial bus manages the use of both the series of the receive buffers and the supply of the process buffers in order to minimize the amount of captured data that is discarded due to unavailable process buffers. Rather than discard captured data from a filled receive buffer when no process buffet is available, the filled receive buffers are cached until process buffers are available or until the receive buffers are needed for additional captured data. Captured data is therefore only discarded when the receive buffer in which the captured data is stored is needed within the series of receive buffers in order to receive additional captured data.

When receiving a stream of continuous data, the data is captured and stored within a current receive buffer, as described above. When the current receive buffer is full, the captured data within the receive buffer is then read out, processed and. stored within a process buffer, if a process buffer is available and no filled receive buffers are on the cached list of receive buffers. When full of processed data, the process buffer is then transferred to an application for utilization or further processing of the processed data. If a receive buffer is filled and there is no process buffer available or if there arc already filled receive buffer on the cached list of receive buffers, the filled receive buffer is then added to tile cached list of receive buffers for processing after the earlier filled receive buffers on the cached list of received buffers are processed or emptied and a process buffer is available. When a process buffer is then available, the data within the earliest filled receive buffer on the cached list of receive buffers is processed and transferred to the available process buffer. When the cached list of receive buffers includes a predetermined number of receive buffers, then the data within the earliest filled receive buffer on the cached list of buffers is discarded and the emptied receive buffer is added to the series of available receive buffers to receive the current captured data.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used to capture and process data received over an IEEE 1394-1995 serial bus structure, the present invention could also be used to capture and process data received over any other appropriate bus structures. It will also be apparent to those skilled in the art that while the preferred embodiment of the present invention has been described as being implemented within a computer system, the present invention can be utilized within any device receiving a stream of data.

We claim:

1. A method of processing received time dependent data comprising:
   a. storing received data within a receive buffer;
   b. adding the receive buffer to a cached list of receive buffers if there are previously filled buffers on the cached list of receive buffers;
   c. adding the receive buffer to the cached list of receive buffers if no process buffer is available; and
   d. processing the received data within the receive buffer if the process buffer is available and there are no previously filled buffers on the cached list of receive buffers.

2. The method as claimed in claim 1 further comprising processing data within an earliest filled receive buffer on the cached list of receive buffers if the process buffer is available and there are previously filled buffers on the cached list of receive buffers.

3. The method as claimed in claim 2 further comprising storing processed data within the process buffer.

4. The method as claimed in claim 3 further comprising providing a filled process buffer to an application.

5. The method as claimed in claim 4 further comprising adding the earliest filled receive buffer on the cached list of receiver buffers to a list of available receive buffers if the cached list of receive buffers includes a number of buffers.

6. The method as claimed in claim 5 wherein the number of buffers is equal to one half a number of available receive buffers.

7. The method as claimed in claim 6 wherein the received data is captured from an IEEE 1394-1995 bus.

8. The method as claimed in claim 5 further comprising adding an available process buffer to a cached list of process buffers if no receive buffers are filled when the available process buffer becomes available.

9. A method of receiving and processing received time dependent data comprising:
   a. storing received data within a receive buffer, thereby forming a filled receive buffer;
   b. adding the filled receive buffer to a cached list of receive buffers if there are previously filled buffers on the cached list of receive buffers;
   c. adding the filled receive buffer to the cached list of receive buffers if no process buffer is available; and
   d. processing the received data within the filled receive buffer if the process buffer is available and there are no previously filled buffers on the cached list of receive buffers.

10. The method as claimed in claim 9 further comprising processing data within an earliest filled receive buffer on the cached list of receive buffers if the process buffer is available and there are previously filled buffers on the cached list of receive buffers.

11. The method as claimed in claim 10 further comprising of storing processed data within the process buffer.

12. The method as claimed in claim 11 further comprising providing a filled process buffer to an application.

13. The method as claimed in claim 12 further comprising adding the earliest filled receive buffer on the cached list of receive buffers to a list of available receive buffers if the cached list of receive buffers includes a number of buffers.

14. The method as claimed in claim 13 wherein the received data is captured from an IEEE 1394 bus.

15. The method as claimed in claim 14 wherein the number of buffers is equal to one half a number of available receive buffers.

16. The method as claimed in claim 13 further comprising adding an available process buffer to a cached list of process buffers if no receive buffers are filled when the available process buffer becomes available.

17. A method of transmitting a continuous stream of data, including a plurality of packets of data, from a transmitting node to a receiving node over an IEEE 1394 serial bus structure, comprising:
   a. receiving the packets of data at the receiving node, thereby forming received data;
   b. storing the received data within a receive buffer thereby forming a filled receive buffer;
   c. adding the filled receive buffer to a cached list of receive buffers if there are previously filled buffers on the cached list of receive buffers;
   d. adding the filled receive buffer to the cached list of receive buffers if no process buffer is available;
   e. processing the received data within the filled receive buffer if the process buffer is available and there are no previously filled buffers on the cached list of receive buffers; and adding an earliest filled buffer on the cached list of receive buffers to a list of available receive buffers if the cached list of receive buffers includes a number of buffers.

18. The method as claimed in claim 17 further comprising processing data within the earliest filled receive buffer on the cached list of receive buffers if the process buffer is available and there are previously filled buffers on the cached list of receive buffers.

19. The method as claimed in claim 18 further comprising storing processed data within the process buffer.

20. The method as claimed in claim 19 further comprising providing a filled process buffer to an application.

21. The method as claimed in claim 20 wherein the number of buffers is equal to one half a number of available receive buffers.

22. The method as claimed in claim 20 wherein the received data is captured from an IEEE 1394 bus.

23. The method as claimed in claim 20 further comprising adding an available process buffer to a cached list of process buffers if no receive buffers are filled when the available process buffer becomes available.

24. A network of devices comprising:
   a. a transmitting device for transmitting packets of data;
   b. a bus structure coupled to the transmitting device, wherein the packets of data are transmitted over the bus structure; and
   c. a receiving device coupled to the bus structure to receive the packets of data, the receiving device including:
      i. a receiving circuit for receiving the packets of data;
      ii. a plurality of receive buffers for storing received data;
      iii. a plurality of process buffers for storing processed data and providing the processed data to an application;
      iv. a processing apparatus for processing received data thereby forming the processed data and storing the processed data within the processed buffers; and
      v. a cached list of receive buffers, wherein a filled receive buffer is added to the cached list of receive buffers if no process buffers are available when the filled receive buffer is filled and further wherein a filled receive buffer is added to the cached list of receive buffers if there are previously filled receive buffers on the cached list of receive buffers when the filled receive buffer is filled.

25. The network of devices as claimed in claim 24 wherein data within an earliest filled receive buffer on the cached list of receive buffers is processed first and stored within an available process buffer, if there are previously filled buffers on the cached list of receive buffers.

26. The network of devices as claimed in claim 24 wherein an earliest filled receive buffer on the cached list of receive buffers is added to a list of available receive buffers, if the cached list of receive buffers includes a number of buffers.

27. The network of devices as claimed in claim 24 wherein the bus structure is an IEEE 1394 bus structure.

28. The network of devices as claimed in claim 24 further comprising a cached list of process buffers, wherein an available process buffer is added to the cached list of process buffers if no receive buffers are filled when the available process buffer becomes available.

29. A method of processing received time dependent data comprising:
   a. storing received data within a receive buffer;
   b. adding the receive buffer to a cached list of receive buffers if there are previously filled buffers on the cached list of receive buffers;
   c. adding the receive buffer to the cached list of receive buffers if no memory buffer is available; and
   d. processing the received data within the receive buffer if the memory buffer is available and there are no previously filled buffers on the cached list of receive buffers.

30. The method as claimed in claim 29 further comprising processing data within an earliest filled receive buffer on the cached list of receive buffers if the memory buffer is available and there are previously filled buffers on the cached list of receive buffers.

31. The method as claimed in claim 30 further comprising storing processed data within the memory buffer.

32. The method as claimed in claim 31 further comprising providing a filled memory buffer to an application.

33. The method as claimed in claim 32 further comprising adding the earliest filled receive buffer on the cached list of receive buffers to a list of available receive buffers if the cached list of receive buffers includes more than a threshold number of buffers.

34. The method as claimed in claim 33 wherein the threshold number of buffers is equal to one half a number of available receive buffers.

35. The method as claimed in claim 34 wherein the received data is captured from an IEEE 1394 bus structure.

36. The method as claimed in claim 33 further comprising adding an available memory buffer to a cached list of memory buffers if no receive buffers are filled when the available memory buffer becomes available.

37. The method as claimed in claim 29 wherein the memory buffer is a process buffer.

38. A method of receiving and processing received time dependent data comprising:
   a. storing received data within a receive buffer, thereby forming a filled receive buffer;
   b adding the filled receive buffer to a cached list of receive buffers if there are previously filled buffers on the cached list of receive buffers;
   c. adding the filled receive buffer to the cached list of receive buffers if no memory buffer is available; and
   d. processing the received data within the filled receive buffer if the memory buffer is available and there are no previously filled buffers on the cached list of receive buffers.

39. The method as claimed in claim 38 further comprising processing data within an earliest filled receive buffer on the cached list of receive buffers if the memory buffer is available and there are previously filled buffers on the cached list of receive buffers.

40. The method as claimed in claim 39 further comprising storing processed data within the memory buffer.

41. The method as claimed in claim 40 further comprising providing a filled memory buffer to an application.

42. The method as claimed in claim 41 further comprising adding the earliest filled receive buffer on the cached list of receive buffers to a list of available receive buffers if the cached list of receive buffers includes more than a threshold number of buffers.

43. The method as claimed in claim 42 wherein the received data is captured from an IEEE 1394 bus structure.

44. The method as claimed in claim 43 wherein the threshold number of buffers is equal to one half a number of available receive buffers.

45. The method as claimed in claim 42 further comprising adding an available memory buffer to a cached list of memory buffers if no receive buffers are filled when the available memory buffer becomes available.

46. The method as claimed in claim 38 wherein the memory buffer is a process buffer.

47. An apparatus to receive and process received data comprising:
   a. a receiving circuit configured to receive received data:
   b. a plurality of receive buffers configured to store received data;
   c. a plurality of process buffers configured to store processed data and provide the processed data to an application;
   d. a processing apparatus configured to process received data thereby forming the processed data and storing the processed data within the process buffers; and
   e. a cached list of receive buffers, wherein a filled receive buffer is added to the cached list of receive buffers if no process buffers are available when the filled receive buffer is filled and further wherein a filled received buffer is added to the cached list of receive buffers if there are previously filled receive buffers on the cached list of receive buffers when the filled receive buffer is filled.

48. The apparatus as claimed in claim 47 wherein data within an earliest filled receive buffer on the cached list of receive buffers is processed first and stored within an available process buffer, if there are previously filled buffers on the cached list of receive buffers.

49. The apparatus as claimed in claim 48 wherein an earliest filled receive buffer on the cached list of receive buffers is added to a list of available receive buffers, if the cached list of receive buffers includes more than a threshold number of buffers.

50. The apparatus as claimed in claim 49 wherein the receiving circuit includes an interface circuit configured to couple to an IEEE 1394 bus structure to receive the received data.

51. The apparatus as claimed in claim 50 further comprising a cached list of process buffers, wherein an available process buffer is added to the cached list of process buffers if no receive buffers are filled when the available process buffer becomes available.

52. A method of receiving and processing received time dependent data comprising:
   a. receiving packets of data at a receiving node thereby forming received data;
   b. storing the received data within a received buffer, thereby forming a filled receive buffer;
   c. adding the filled receive buffer to a cached list of receive buffers if there are previously filled buffers on the cached list of receive buffers, wherein each filled receive buffer on the cached list of receive buffers includes received data that has not been processed;
   d. adding the filled receive buffer to the cached list of receive buffers if no process buffer is available;
   e. processing the received data within the filled receive buffer if the process buffer is available and there are no previously filled buffers on the cached list of receive buffers; and
   f. adding an earliest filled buffer on the cached list of receive buffers to a list of available receive buffers if the cached list of receive buffers includes a number of buffers;
   wherein the receive buffers and the process buffers are maintained in separate lists.

* * * * *

UNITED STATES PATENT AND TRADEMARK OFFICE
CERTIFICATE OF CORRECTION

PATENT NO.      : 6,516,361 B2
DATED           : February 4, 2003
INVENTOR(S)     : Kevin K. Lym et al.

It is certified that error appears in the above-identified patent and that said Letters Patent is hereby corrected as shown below:

<u>Column 11,</u>
Lines 34-40, delete:
"e.     processing the received data within the filled receive buffer if the process buffer is available and there are no previously filled buffers on the cached list of receive buffers; and adding an earliest filled buffer on the cached list of receive buffers to a list of available receive buffers if the cached list of receive buffers includes a number of buffers."
and insert:
-- e.     processing the received data within the filled receive buffer if the process buffer is available and there are no previously filled buffers on the cached list of receive buffers; and
   f.     adding an earliest filled buffer on the cached list of receive buffers to a list of available receive buffers if the cached list of receive buffers includes a number of buffers. --

Signed and Sealed this

Eighth Day of July, 2003

JAMES E. ROGAN
*Director of the United States Patent and Trademark Office*